A. B. COLCORD.
OSCILLATING SCREEN FOR ORE AND OTHER MATERIALS.
APPLICATION FILED JAN. 2, 1908.

911,113.

Patented Feb. 2, 1909.

5 SHEETS—SHEET 1.

A. B. COLCORD.
OSCILLATING SCREEN FOR ORE AND OTHER MATERIALS.
APPLICATION FILED JAN. 2, 1908.

911,113.  Patented Feb. 2, 1909.
5 SHEETS—SHEET 3.

Witnesses:
G. Sargent Elliott
Adella M. Fowle

Inventor:
Albion B. Colcord
By H. S. Bailey, Attorney.

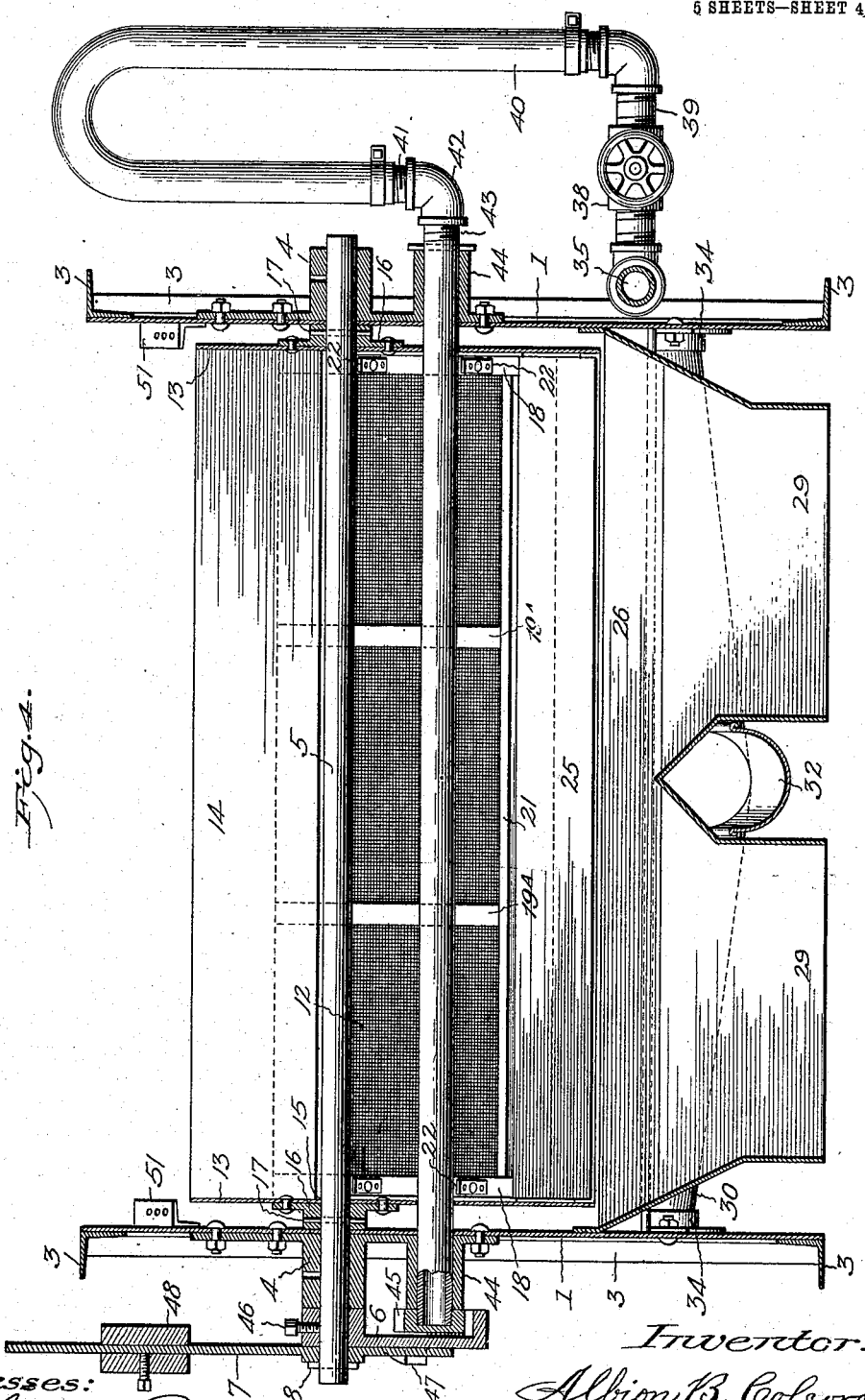

A. B. COLCORD.
OSCILLATING SCREEN FOR ORE AND OTHER MATERIALS.
APPLICATION FILED JAN. 2, 1908.

911,113.

Patented Feb. 2, 1909.

5 SHEETS—SHEET 5.

Witnesses:
G. Sargent Elliott
Adella M. Fowle

Inventor:
Albion B. Colcord
By H. S. Bailey, Attorney.

UNITED STATES PATENT OFFICE.

ALBION B. COLCORD, OF KOKOMO, COLORADO, ASSIGNOR TO ROBERT B. McCONNEY AND CHARLES L. BUCKINGHAM, OF DENVER, COLORADO.

OSCILLATING SCREEN FOR ORE AND OTHER MATERIALS.

No. 911,113.     Specification of Letters Patent.     Patented Feb. 2, 1909.

Application filed January 2, 1908. Serial No. 408,947.

*To all whom it may concern:*

Be it known that I, ALBION B. COLCORD, a citizen of the United States of America, residing at Kokomo, county of Summit, and State of Colorado, have invented a new and useful Oscillating Screen for Ore and other Materials, of which the following is a specification.

My invention relates to improvements in screens for screening and sizing ore and other material; and the object of the invention is: to provide a screen composed of two independent members, which are supported upon a rock shaft, the screen being automatically rocked or oscillated by the weight of ore upon one or the other of the independent screens, so that when one screen descends to discharge the oversize therefrom, the other screen is brought into position to receive a supply of ore pulp, a common feed hopper supplying the two screens, which are separated by a partition.

A further object of the invention is to provide the rock shaft upon which the screens are supported, with means, such as a counter balancing weight, suitably arranged, whereby the screens are thrown forcibly against suitable stops, the bump or jar occasioned thereby causing the particles of material to be dislodged from them; suitable pipes being provided for supplying water to wash the screens, as they discharge, and for supplying water to carry off the oversize product as it falls from the screens into suitable hoppers.

Figure 1:
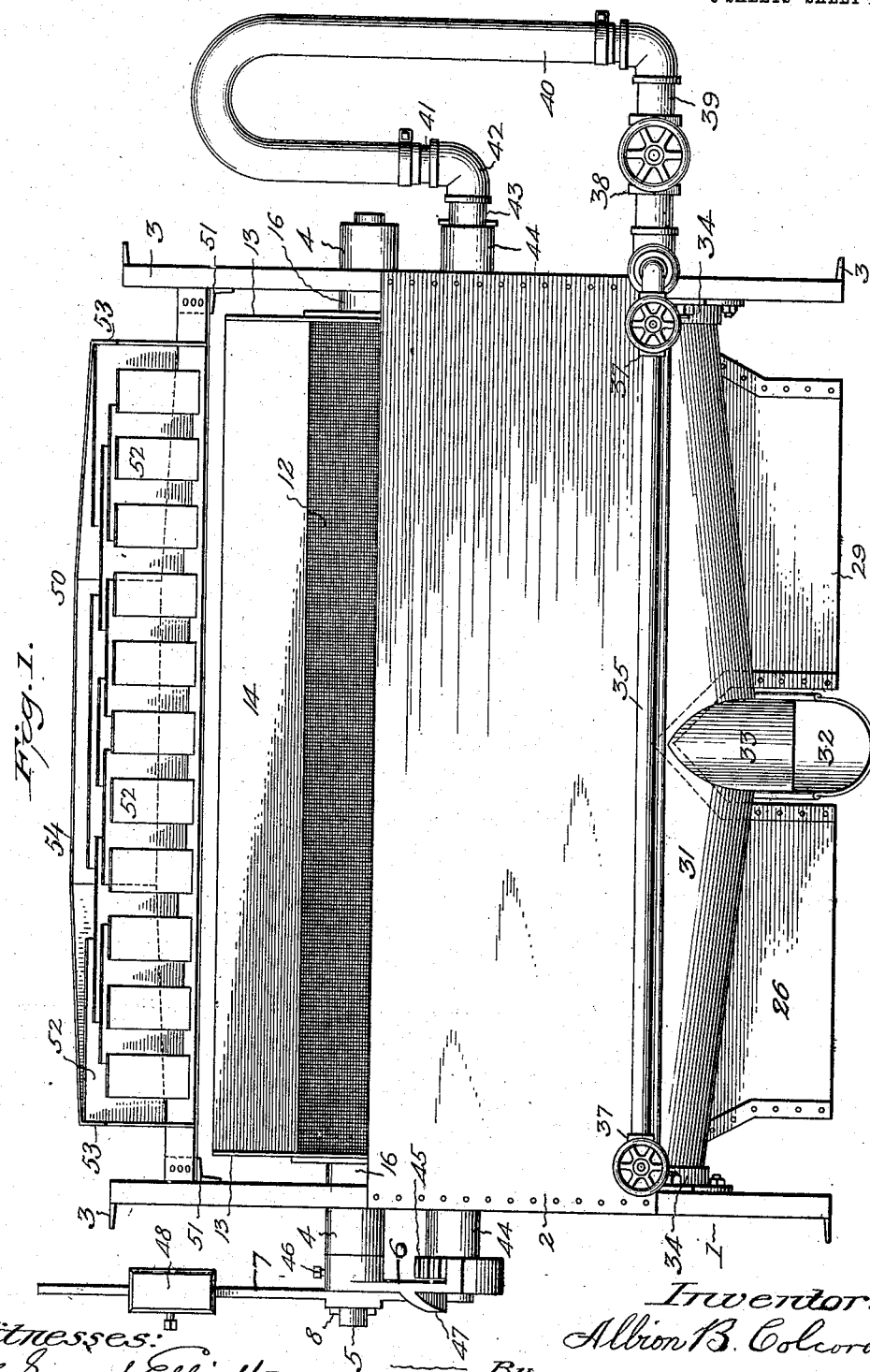
Figure 2:
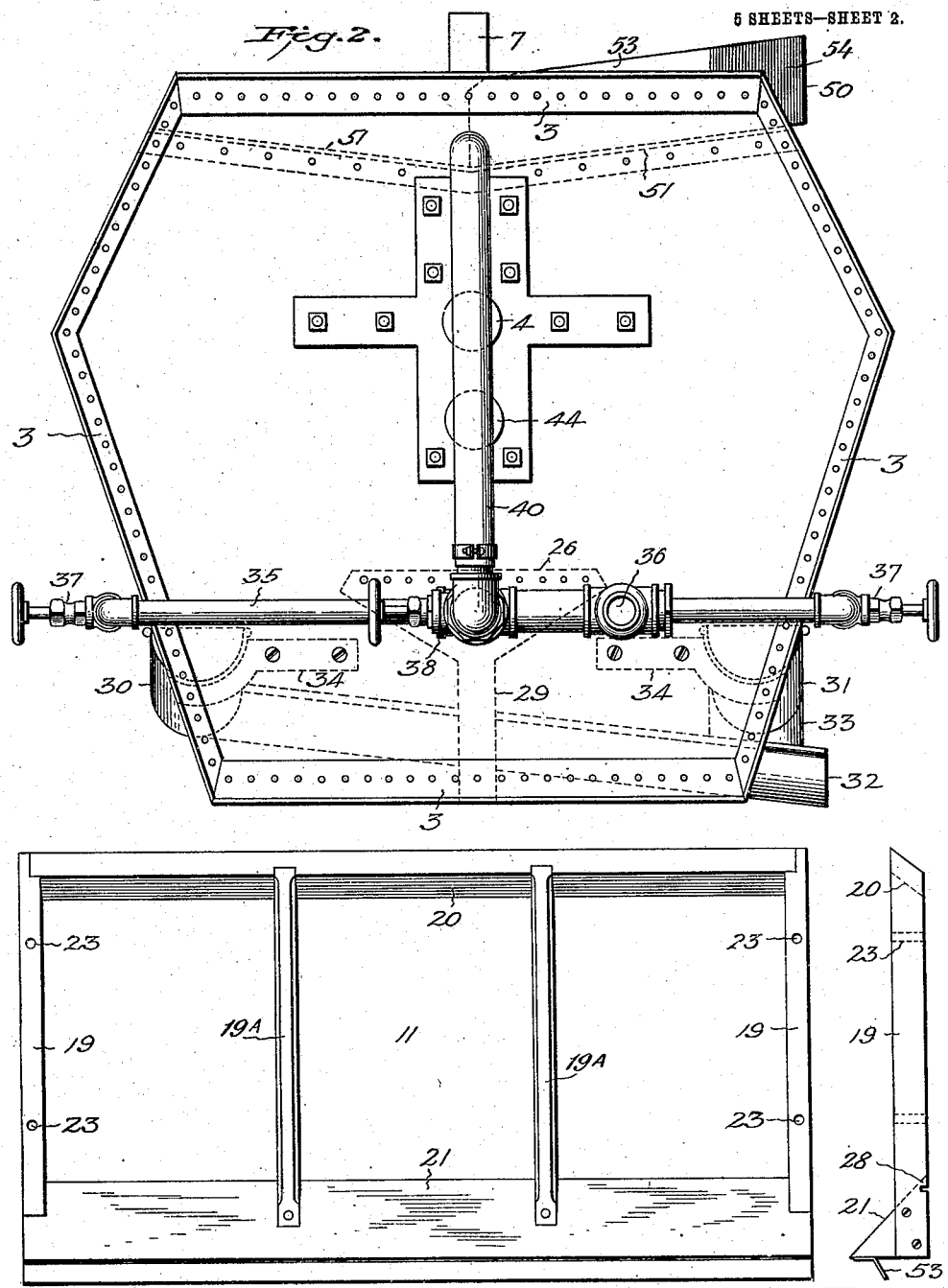
Figure 3:
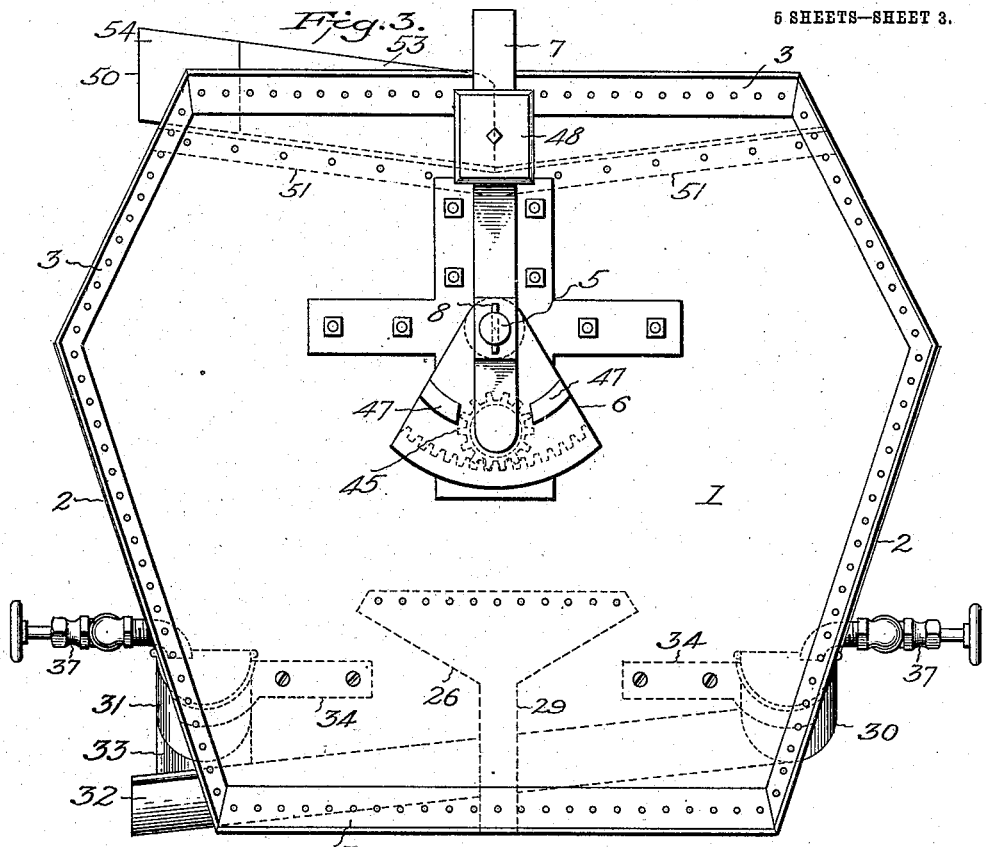
Figure 6:
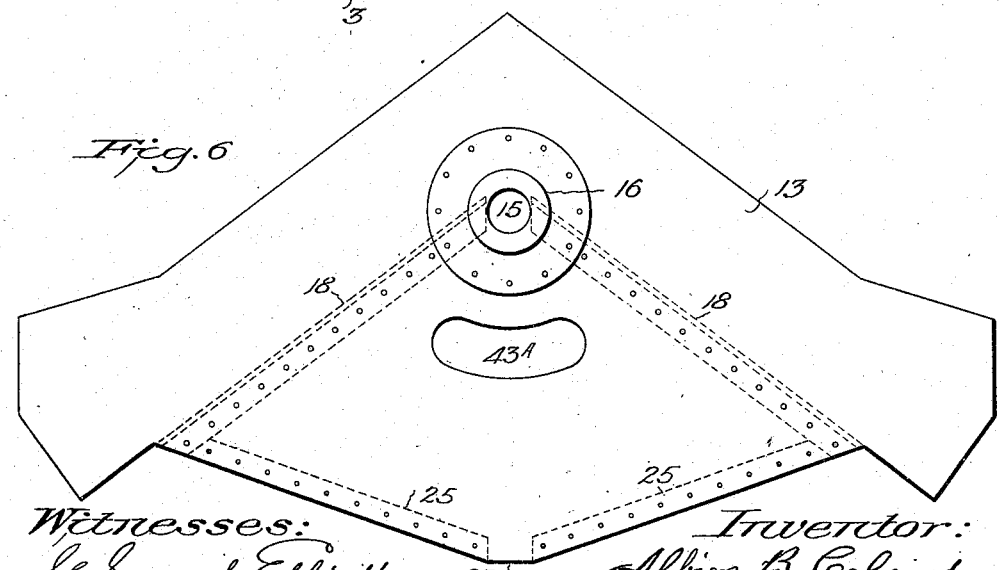
Figure 5:
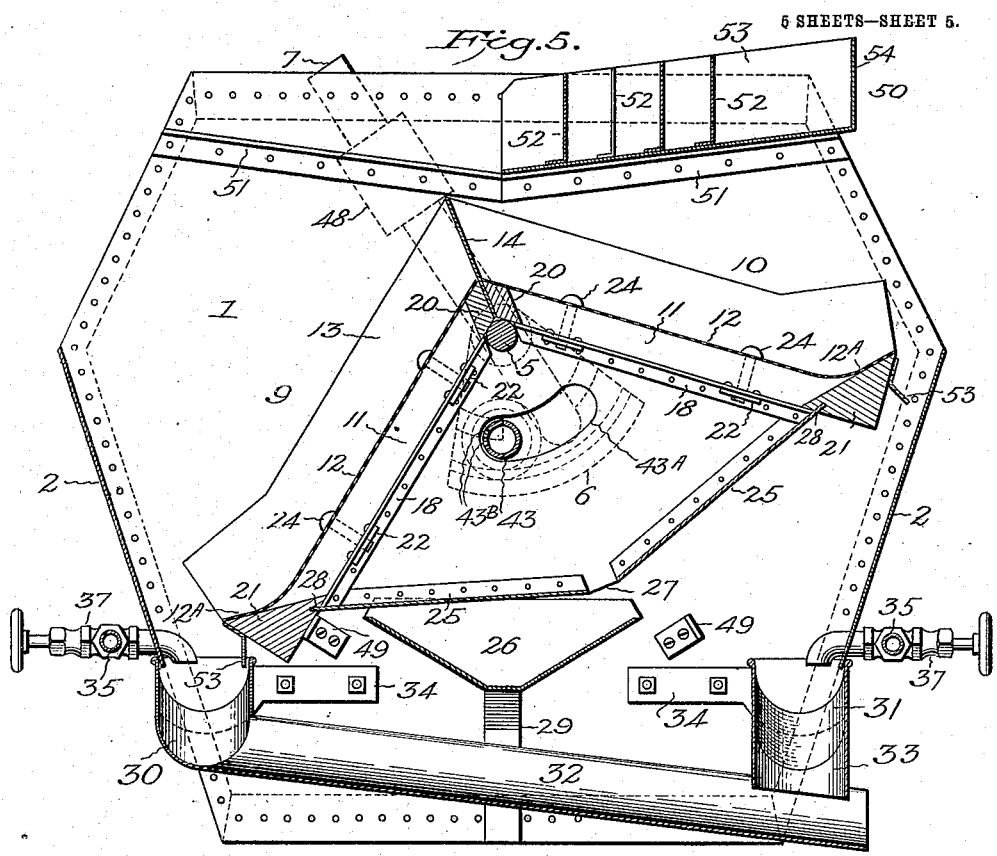
Figure 9:
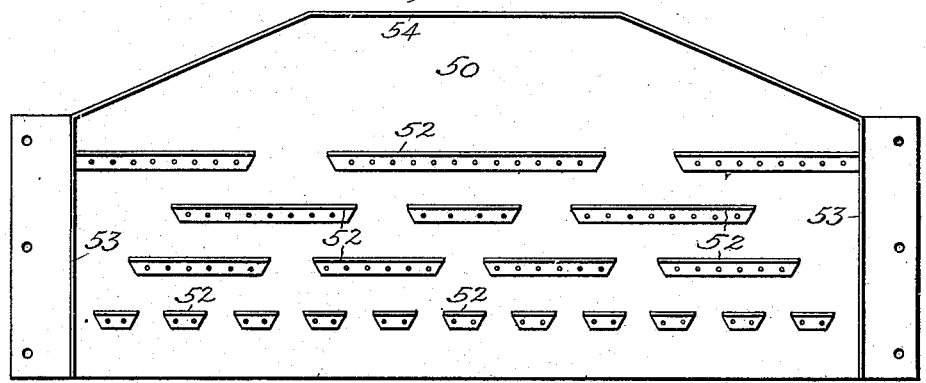

The invention further consists in various details of construction hereinafter fully described, and also set forth in the accompanying drawings, in which:

Figure 1, is a side elevation of the improved screen. Figs. 2 and 3 are end elevations of the same. Fig. 4, is a vertical, longitudinal, sectional view thereof. Fig. 5, is a transverse, vertical, sectional view thereof. Fig. 6, is an end view of the screen supporting rock frame. Fig. 7, is a plan view of one of the removable screen frames upon which the screen fabric is secured. Fig. 8, is an end view of the same. And Fig. 9, is a plan view of the feed hopper.

Referring to the drawings, the numeral 1, designates the ends or standards of the frame of my oscillating screen, which are in the form of irregular hexagons; and 2, the sides, which are riveted or otherwise secured to the ends. The ends 1, consist of a sheet iron plate, the edges of which are faced with angle irons 3, which give rigidity to the plates. The sides 2, consist of metal plates, which are riveted at their extremities to the side angle bars or ends, and the ends are further connected by a longitudinal hopper, to be hereinafter described.

To the upper central portion of the outside of each end plate 1, is secured a flanged journal box 4, in which is journaled a shaft 5, which extends across the frame and through and beyond the boxes far enough to receive the hub of a segment gear 6, and a counter weight lever 7, which lever is held upon the shaft against the segment gear by a pin 8, the lever being loosely mounted on the shaft. The flanges of each journal box are arranged substantially in the form of a cross, and the vertical and horizontal arms are bolted or otherwise secured to the end plates. Upon this shaft, between the standards of the frame, I mount a pair of screens 9 and 10, which join at their upper sides, and which lie relatively to each other, at an angle corresponding to the oblique sides of an isosceles triangle, the apex or meeting point of the screens being above the shaft 5. Each of these screens consists in general of a rectangular frame 11, which supports a rectangular sheet of wire screen cloth 12. The screen frames 11, are supported in a frame capable of a rocking or swinging movement, and which consists of end plates 13, of the form shown in Fig. 6, which are connected at their upper ends by a sheet metal partition plate 14. An aperture 15, is formed in each plate, and a flanged hub 16, is secured by rivets to the outer face of each plate concentric with the aperture 15. These hubs are mounted on the shaft 5, and secured to it by pins 17. The partition plate 14, extends from the apertures 15, to the apexes of the plates.

On the inner face of each plate, and extending downward from the apertures 15, at an angle of about one hundred and fifteen degrees, are riveted angle bars 18, upon which the frames 11, are secured. The frames 11, are preferably constructed of wood, and comprise end strips 19, and side strips 20 and 21, the strips 20 being arranged to lie against the partition plate 14, while the strips 21 form the lower or discharge sides of the frames. These latter strips are triangular in cross section, and their upper faces lie at a slight angle to a horizontal plane, when the frames are balanced, and so as to incline toward each other. Additional cross strips 19$^A$ are secured across the frames, between the end strips 19, and prevent undue sagging of the screens; and upon the tops of these frames, the screens 12, are secured in any suitable manner, their lower edge terminating in an outward curve or roll 12$^A$.

Upon the under side of each angle iron 18, is secured a thick piece of metal 22, and through the screen receiving part of these angle bars and also through the metal pieces 22 I form thread apertures, and through each of the side bars of the screen frame I form two apertures 23, to register with the threaded apertures in the angle iron and metal pieces, and the screen and its wooden frame are secured to the angle bars 18 by headed screws 24, which extend loosely through the apertures in the sides of the screen frame and screw into the threaded holes in the angle irons and their metal pieces, and thus clamp the screen cloth and its wooden screen frame to the metal frame.

A screenings catching pan 25, is placed below each screen and is arranged to collect the screenings and deposit them into a general hopper 26. These pans 25, are riveted at their ends to the plates 13, of the screen frame support, and incline downward toward a common point, terminating a short distance from each other, to form a discharge opening 27, which is always above the hopper 26. The outer side edges of the pans project into grooves 28, formed in the adjacent faces of the strips 21, of the screen frame 11, and by this means leakage is prevented, when the pans are at the limit of their down movement, as will be understood by reference to Fig. 5.

The hopper 26 comprises a trough shaped receiving portion, large enough to receive the screenings from the oscillating screenings catching pans, and a discharge spout 29, which extends from the bottom of the trough to a point on a plane with the bottom of the standards of the supporting frame.

The side plates 2, of the frame of the machine, extend across from the edge of one standard to the edge of the opposite standard, and their upper edges terminate at a point corresponding to the highest position reached by the screens in their oscillating movement, while their lower edges extend to a point slightly below the lowest position reached by the screens, and at their lower edges on the inside of these plates oversize chutes 30 and 31, are placed, so as to be directly below the lower or discharge ends of the screens when at the lowest point of their downward movement. These oversize troughs incline downward from the standards 1, towards the center of the main frame, sufficiently to cause the oversize material to flow through them from each end towards a common discharge opening. A discharge spout 32, extends from the trough 30 across to, and under, and beyond the opposite trough 31, at a sufficient downward angle to cause the oversize material to flow through it, and a short discharge spout 33 extends from the trough 31 into the discharge spout 32. These oversize troughs are seated in and are secured to saddle plates 34, which are secured to the end standards.

A water supply pipe 35 is extended across one end of the machine, and also along its sides close to the oversize hoppers 30 and 31, and a water inlet pipe 36 connects these pipes with a supply of water under pressure. A valve 37 is placed in each end of that portion of the water supply pipe that extends along the oversize troughs in order to admit a controllable supply of water to the highest end portions of each trough, and a valve 38 is placed in a branch outlet pipe 39 connected with the water supply pipe, to which branch pipe one end of a hose 40 is attached. This hose extends vertically upward and its upper end portion is curved and returned upon itself to extend downward in the form of a yoke, in order that it may bend readily as the screen frame oscillates, and its opposite end is coupled to a nipple 41, that is connected to an elbow 42, which is secured to the end of a water spraying pipe 43, which is journaled in bearings 44, which form the lower part of the flanges, upon which the bearings 4, which support the shaft 5, are formed. This water pipe extends through the main frame, between the screens and beyond the opposite bearing 44, and a pinion 45, which is bored partially through, is secured upon this end of the pipe, in such a way as to prevent leakage. This pinion meshes with the segment gear 6, the hub portion of which is mounted upon and rigidly secured to the shaft 5, by a set screw 46. This segment gear is provided on its outer face with two oppositely arranged lugs 47, between which the lower end of the counter-weight lever 7 lies, the space between them being greater than the width of the lever, so as to allow the lever a limited rocking movement on the shaft 5. The lever 7, is provided with a vertically adjustable weight 48, which is provided with a set screw, and is adapted to be thrown by gravity to either side of a dead center line, as one or the other of the screens approaches its lowermost position, thereby accelerating the downward movement of the screen, and causing it to contact forcibly and with a bump against a pair of stops 49, which are secured to the end plates 1 of the main frame. The rocking movement of the lever is limited by one or the other of the lugs 47, and the force of the bump imparted to the screen is determined by the position of the weight upon the lever, and the weight also prevents the screen from tipping until a suitable quantity of ore has been deposited upon the receiving screen.

The water spraying pipe 43, is provided with longitudinal rows of perforations 43$^B$, which discharge jets of water on the discharging screen, and as the double screen rocks, the segment gear 6 will rotate the pinion 45, together with the pipe 43, sufficiently to cause the rows of perforations in the pipe to face the discharging screen, so that the water from the pipe may thoroughly dislodge all particles of ore pulp from the meshes of the screen. The water pipe is thus turned alternately as the screen oscillates, to wash the discharging screen, as will be apparent by reference to the drawings. The end plates 13, of the screen support, are provided with segmental slots 43$^A$, through which the pipe 43 passes, and these slots allow the support its rocking movement, relatively to the said pipe.

A hopper 50 is placed above the screen across the top portion of the machine between its opposite side standards, and at one side of its center, so that its discharge edge stands directly over the center of the oscillating screen shaft 5. This hopper rests on and is riveted to angle iron bars 51, which are riveted to the inside faces of the ends 1, of the main frame. This hopper and the angle irons on which it rests are inclined downwardly and inwardly from the outside of the frame to its center enough to allow the ore or other material to flow easily through it. This hopper comprises a flat bottom, provided with upwardly projecting end plates 53, and a plate 54 at the outer side, which plates inclose the hopper on three sides, as shown in Fig. 9, leaving the discharge side open, and in order to distribute the stream of discharging ore or other material evenly over the discharge edge, I secure a plurality of upright ore pulp dividing blades 52, to the bottom of the hopper, which preferably extend up even with its side and ends. I preferably arrange these projecting blades in rows, spacing the rows at about equal distances apart across the greater portion of the hopper, and space the blades at equal distances apart in each row, but arrange them so that the blades nearest the feed end of the hopper are the longest and widest apart, and those of the second row from the feed end are a little shorter in length, and the spaces between them are a little closer together, and the blades of the third and fourth rows and the spaces between them are still shorter and narrower in the same order. The object of these projecting blades is to divide and subdivide the supply of flowing ore pulp into small streams. Thus I illustrate four rows of blades for dividing the flowing current of ore pulp into enough streams to insure an even distribution of the ore pulp across the hopper, and an even thickness of the flowing stream of ore pulp as it discharges from the discharge lip of the hopper. The first row of dividing blades at the feed end of the hopper divides the current at its central portion into two streams as it flows through the two spaces between the blades; these two streams then flow to the second row of blades, where they are divided into four streams. The third row divides it into five streams, and the fourth row into twelve streams, from which it flows at an even depth over the discharge edge of the hopper, from which it drops upon and flows across the head or feed end of the screens in alternate order, on either one side or the other of the apex partition as the screens are tilted below it by the weight of the flowing ore pulp.

The operation of my oscillating screen is as follows: The ore pulp, which is finely crushed ore and water mixed to make a flowing stream, is fed from a source of supply, such as a stamp mill, through a suitable chute or launder, into the feed end of the hopper, from which it flows between the dividing blades of the hopper over the discharging edge thereof, from which it falls upon and flows in a continuous stream onto either one or the other of the screens that happens to be up in position to catch it, and assuming that the screen 10 at the right hand side of the machine is standing in a substantially flat or horizontal plane under the stream of ore pulp, the ore pulp flows evenly onto it, and as the screen is slightly inclined downward, the ore will also flow evenly over its surface towards its discharge end, and all of the ore sand of the ore pulp that is fine enough flows through the screen and drops into the pan 25, and from this pan it flows into the hopper 26. The discharge side of the hopper 50, is of the same width as the screens; consequently the ore pulp flows over the whole width of the screens, and the oversize accumulates upon the screen in sufficient quantities to over-balance the counter-weight, which is set at a point on the lever that will allow the screen to tilt downward under any desired accumulation of oversize, and the instant the oversize has accumulated enough to over-balance the weight 48, the screen 10 tilts downward and its load of oversize, which has accumulated at the discharge end of the screen near its upward curved end, flows from it into the adjacent hopper 31, from which it is washed by a stream of water from the water supply pipe 35, into and out of the discharge spout 32, and as the screen 10 moves downward, the screen 9 moves upward, and the partition plate 14, is moved through the stream of ore pulp flowing from the lip of the discharge hopper to the opposite side of it, and the ore pulp then flows onto the screen 9, where the operation is repeated, and as the screens swing alternately up and down, the weighted lever swings a short distance beyond the vertical center of the apex of the screens, causing them to bump forcibly against the stops 49, and thereby dislodge the particles of ore from the screen. The partial rotation of the shaft 5, and segment gear 6, gives a partial rotation or oscillating movement to the pinion 45, that is secured to the end of the water pipe, which rotates this pipe one-half of a revolution, so that jets of water will be discharged from the apertures in the pipe, against the under side of the discharging screen, in alternate order, the pinion and pipe oscillating a half revolution as each screen swings from its load-receiving to its load-discharging position, and discharges three rows of water jets from the pipe against the under side of the screens. An apron 53, is secured to the outer strips 21, of each screen, which extends into the adjacent chute or spout 30 or 31, as the case may be, and prevents the pulp flowing backward over the edges of the said chute, and thus being wasted.

When dry ores or other dry material is to be screened in my oscillating screen, the water supply hose and its coupling and the elbow can be disconnected from the water discharging pipe 43.

The feed hopper 50, can be placed on either side of the screens, as may be most convenient.

Having described my invention, what I claim as new and desire to secure by Letters Patent, is:

1. In an oscillating screen, a pair of angularly disposed screens connected together at one of their ends, a shaft to which said screens are attached, an adjustable counter-weight attached to said shaft and arranged to hold said screens in material receiving and screening position until the load of oversize material on said screen outweighs said counter-weight, said shaft and its counter-weight and said screens being arranged to oscillate a predetermined distance in alternate order from an operative ore receiving and screening position to an oversize discharging position, means including a hopper for flowing material over said screens in alternate order at each end of the oscillating movement of said screens, means for collecting the screenings product of both screens together, means for leading the oversize product of said screens from them and collecting it together, and means including piping for flowing jets of water against the underside of said screens in alternate order when in their oversize discharging position.

2. In an oscillating screen, a pair of angularly disposed screens, which abut at their upper ends, a shaft to which said screens are attached, an adjustable counter-weight attached to said shaft and arranged to hold said screens in material receiving and screening position until the load of oversize material on said screen outweighs said counter-weight, said shaft and its counter-weight and said screens being arranged to oscillate a predetermined distance in alternate order from an operative ore receiving and screening position to an oversize discharging position, means including a hopper for flowing material over said screens in alternate order at each end of the oscillating movement of said screens, means for collecting the screenings product of said screens, means for leading the oversize product of said screens from them and collecting it together, means including piping for flowing jets of water against the under side of said screens in alternate order when in their oversize discharging position, and means including piping for flowing a supply of water into the oversize material after its discharge from said screens.

3. In an oscillating screen for ore and other material, the combination of the supporting frame, with a shaft journaled in said frame, a pair of angularly disposed screens arranged in the form of the sides of an isosceles triangle, abutting at their upper ends, and supported upon said shaft, an adjustable counter-weight attached to said shaft in alinement with the apex of said screens, said screens and shaft and counter-weight being pivotally journaled to oscillate in alternate order from an operative ore receiving and screening position to an ore oversize discharging position, a hopper arranged to feed ore to the ends of said screens in alternate order, an upwardly curved discharge end portion to said screens adapted to permit a sufficient amount of oversize to accumulate on said screen to cause said screen to over-balance said counter-weight whereby each screen automatically receives and screens a predetermined amount of ore and discharges its oversize intermittently.

4. In an oscillating screen, the combination of the frame with a shaft pivotally journaled therein, a pair of screens supported upon said shaft, which abut and incline downward from the abutting point, a lever loosely mounted on one end of said shaft in vertical alinement with the apex of said screens, a segment gear on said shaft, an adjustable weight on one end of said lever, a hopper arranged to feed ore in a downward vertical stream in alinement with the axial vertical center of said shaft, a projecting terminal end portion on said screens, means including a hopper arranged below said screens for collecting the screenings material from said screens, means including a trough positioned along the opposite end portions of said frame below the oversize discharging end of said screens, arranged to receive and collect the oversize from said screens together and discharge it from said frame, a water supply pipe rotatably journaled across said frame and positioned between said screens below their apex portion, having water spray discharging apertures positioned on one side, a pinion on one end of said water spray pipe in mesh with said gear segment of said lever, arranged and adapted to turn said pipe so that its water jet discharging apertures will face the underside of each screen when in its oversize discharging position in alternate order, and means including a flexible pipe connected to said water spray discharging pipe for discharging a supply of water under pressure from the jet apertures of said water spray pipe.

5. In an oscillating screen, the combination with a frame, a feed hopper mounted on said frame, a shaft rotatably mounted in said frame, and an adjustable counter-balancing weight attached to said shaft, of a pair of screens supported by said shaft in operative relation to said hopper, and arranged to receive and operatively screen and discharge ore pulp, by an oscillating movement governed by said weight, a screenings catching pan under each screen arranged to discharge during the upward position of the screen, and a hopper below said pans arranged to receive the discharging screenings of said pans.

6. In an oscillating screen, the combination of the frame, a feed hopper at the top of said frame, discharge troughs at the bottom of said frame, a valve controlled pipe arranged to flow a supply of water into said troughs, a shaft journaled in said frame below said feed hopper, screens supported by said shaft and arranged to be tilted from a substantially horizontal to a substantially vertical plane, a counter-weight mounted on said shaft to hold said screens in a substantially horizontal plane in alternate order until the volume of oversize material on said screens over-balances said counter-weight, means for limiting the oscillating movement of said screens, means including a hopper below said screens for catching the screenings material of said screens, a perforated pipe between the under sides of said screens, means including a valve-controlled flexible hose connected to said water supply pipe, and gearing connecting said perforated pipe to said shaft for discharging a plurality of water jets to the under side of said screens in alternate order.

7. In a screen as specified, the combination with a main frame, of a shaft extending through and mounted in said frame; a segment gear rigidly secured adjacent to one end of the shaft and lugs on the outer face of said gear; a lever loosely mounted on the shaft, having an adjustable counter-balancing weight on one end, the other end of said lever being extended to lie between the lugs on the segment gear; a rock frame supported by the shaft, having downwardly inclined ledges; screens secured to said ledges, and a partition separating said screens; a perforated pipe extending through the main frame between the screens; a pinion on one end of the pipe in mesh with the segment gear, and a valve-controlled water connection on the other end of the pipe; screenings pans below the screens, and a hopper which receives the material from said pans; discharge spouts in the main frame, said rock frame being moved by the weight of the ore to bring the empty screen uppermost, while the loaded screen is discharging, and a common feed hopper for said screens.

8. In a screen as specified, the combination with a main frame, of a shaft mounted therein; a rock frame secured to the shaft, comprising end plates and inclined bottom plates, which terminate a slight distance from each other to leave a discharge opening; angle bars secured to each end plate in a manner to form an inverted V, the apex of which is above the said shaft; frames bolted to said angle bar and screening fabric secured to the frames; a partition plate between the frames at their apex; a lever on said shaft having an adjustable counter-balancing weight, and a perforated water pipe mounted in the main frame, between the screens; means connecting the shaft and water pipe, whereby the latter is rotated when the frame is rocked by the weight of the ore on one or the other of the screens, to alternately spray the screens, and a common hopper for the screens.

9. In a screen as specified, the combination with a main frame, of a shaft pivotally mounted therein; an arm loosely mounted on the shaft so as to extend each side of the same; an adjustable weight on the arm; a segment gear rigidly mounted on the shaft; a frame secured to the shaft, comprising end plates, and a bottom having a discharge outlet; screens supported on the frame, forming substantially an inverted V, having its apex above the shaft; a common feed hopper above said screens; a perforated water spraying pipe journaled in the main frame between the screens, connected with a water supply at one end; a pinion on the other end, which is engaged by the segment gear; lugs on said gear between which one end of the arm, having the weight, lies, said lugs being far enough apart to afford the arm a limited rocking movement on the shaft; the shaft supported frame being rocked when sufficient material has accumulated on either screen to over-balance the weight; independent hoppers for the screenings and over-size, and stops against which the screens are forcibly impinged on their downward movement, when the counter-balancing weight passes its center of gravity.

In testimony whereof I affix my signature in presence of two witnesses.

ALBION B. COLCORD.

Witnesses:
GUY QUACKENBUSH,
ALBIN ANDERSON.